May 2, 1950 P. FARKAS 2,506,201
ADJUSTING DEVICE FOR SHOES OF BRAKES
OF THE DRUM TYPE
Original Filed May 27, 1946
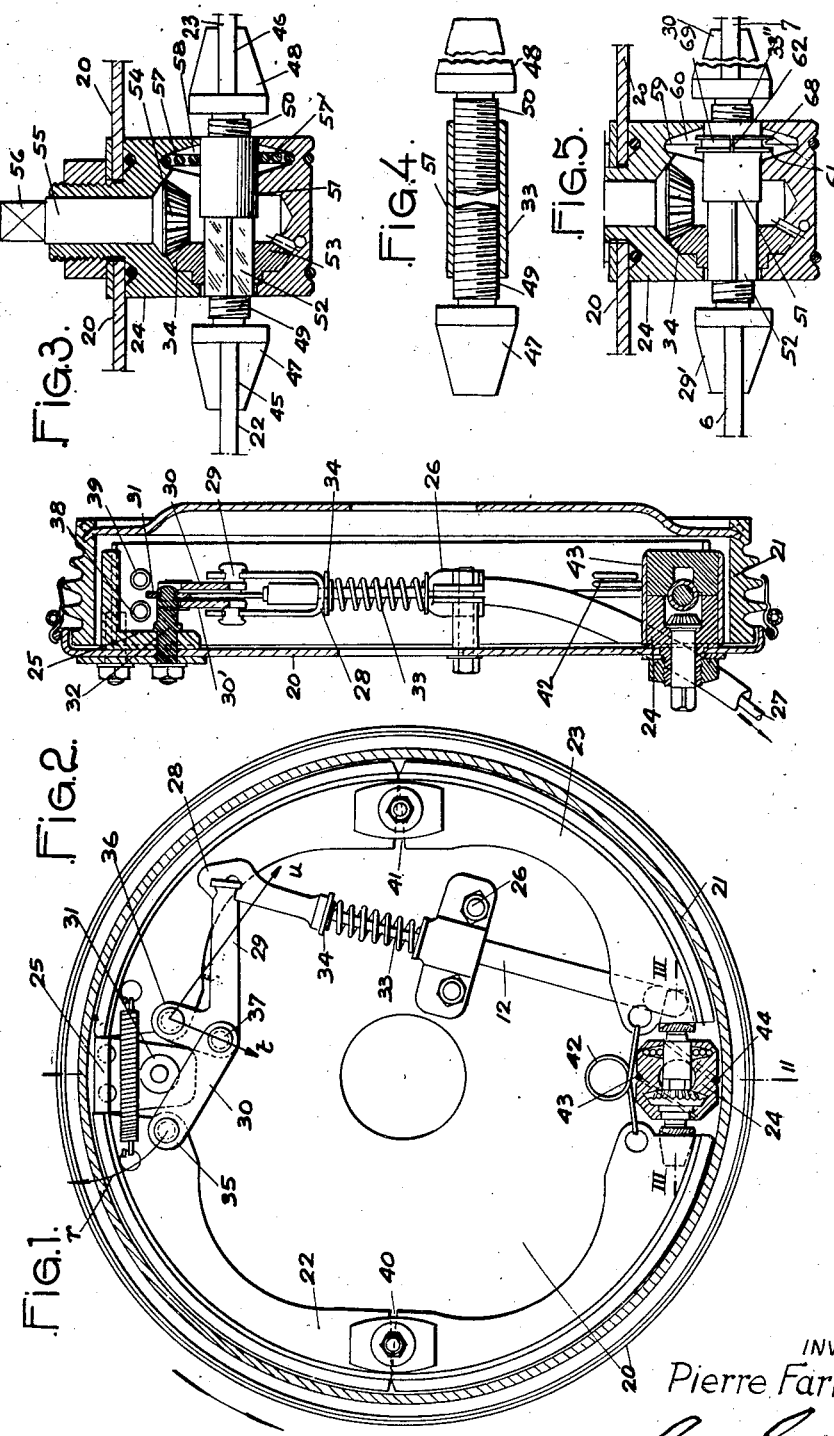
INVENTOR
Pierre Farkas
ATTORNEY.

Patented May 2, 1950

2,506,201

UNITED STATES PATENT OFFICE 2,506,201

ADJUSTING DEVICE FOR SHOES OF BRAKES OF THE DRUM TYPE

Pierre Farkas, Paris, France

Original application May 27, 1946, Serial No. 672,516. Divided and this application November 13, 1947, Serial No. 785,751. In France November 18, 1942

Section 1, Public Law 690, August 8, 1946
Patent expires November 18, 1962

4 Claims. (Cl. 188—79.5)

This is a division of applicant's copending application Serial Number 672,516, filed May 27, 1946.

The present invention relates to an improved device for adjusting the position of the expanding shoes of a brake of the drum type, in order to compensate for wear, whether uniform or not, of the linings of two or more sleeves.

A known form of brake of this kind comprises a pair of arcuate shoes mounted on a relatively fixed back-plate with one pair or adjacent ends of the shoes spring urged against some form of expander with which they can be urged apart against the drum so as to produce a desired braking effect. It is also known to connect the other pair of adjacent ends together in such a way that the separation between these ends may also be increased when desired, by hand, so as to compensate for wear of the linings.

It is an object of the present invention to provide an improved adjusting device which (a) serves to return the shoes to their off positions after each normal application of the brakes, (b) serves automatically to correct for unequal wear of the linings of the shoes, and (c) can be used to take up the shoes to compensate for equal wear of the linings.

With these objects in view, and in accordance with the invention, there is provided a wear-compensating device for brakes of the drum and expanding shoes type, including a brake drum, a relatively fixed back-plate, a pair of arcuate shoes, brake-operated means for expanding one pair of adjacent ends, an adjusting member adjustably connected to both shoes and to the back-plate.

Preferred embodiments of the invention will now be described with reference to the accompanying drawings, in which Figure 1 is a side view in elevation, partly in section, of a mechanical brake incorporating the invention, Figure 2 is a cross-sectional view taken on the line II—II of Figure 1, Figure 3 is an enlarged cross-sectional view taken on the line III—III of Figure 1, Figure 4 is a plan view of a portion of the adjusting device shown in the earlier figures, and Figure 5 is a cross-sectional view similar to that of Fig. 3 but showing a modification of the invention.

The brake illustrated in Figures 1, 2 and 3 comprises a back plate 20 rigidly secured to a vehicle, a brake drum 21 fixed to a road wheel of the vehicle, and mounted on the back-plate 20 a pair of arcuate brake-shoes 22 and 23, which may be respectively split at 40 and 41 if desired, a device 24 for taking up wear of the lining on the shoes and on which the shoes are pivoted, a wedge-shaped abutment 25 having radial faces, against which one pair of adjacent ends of the shoes may bear, and a bracket 26 serving to hold and locate a sheathed brake-operating cable 27 ending in a bifurcated hook 28 engaging shoe-expanding toggle mechanism in the form of a double bell-crank lever 29 and a double link 30.

The two parts of the parallel pair of links, which can be seen at 30 and 30' in Figure 2, are kept in suitably spaced disposition by a washer 31 mounted on a peg 32 fixed on the back-plate 20, while the bifurcated hook 28 is urged to its uppermost position by a helical spring 33 compressed between a collar 34 on the hook and the bracket 26.

The double link 30 is pivoted on the shoe 22 at 35 and the shorter arm of the double bell-crank lever 29 is pivoted on the other shoe 23 at 36, the lever and link being pivoted together at 37 to constitute the knuckle of the toggle joint which is operated by movement of the longer arm of the bell-crank lever by the hook 28 operated by the cable 27.

The top adjacent ends of the shoes 22 and 23 are urged against the segmental abutment 25 by a pair of helical springs 38 and 39, and are urged into pivotal contact with the wear-compensating device 24 at their lower ends by a spring 42.

The compensating device 24, besides permitting the transmission of movement from one shoe to the other, can also be used to compensate for wear of the shoe-linings, whether equal or not, by separating the lower ends of the shoes.

The device comprises a two-piece dust-tight housing 43 (Figure 2) fixed on the back-plate 20, the two parts of which housing are secured together by stirrups 43 and 44 (Figure 1). The shoes 22 and 23 are movably engaged in slots 45 and 46 respectively formed in yokes 47 and 48 provided with oppositely threaded fingers 49 and 50 (Figure 4) engaging a single correspondingly threaded sleeve 51. One longitudinal portion of this sleeve is cylindrical and the remainder, at 52, is of polygonal section on which is relatively slidable but angularly fast, a bevel pinion 53 meshing with a second bevel pinion 54 secured on the end of a shaft 55 the outer end 56 of which is squared to take an adjusting key or spanner.

The pinion 53 nests in a recessed seating in the housing 43, so that it is longitudinally immovable, but the sleeve 51, 52 can reciprocate, in the longitudinal direction, within this pinion.

Around the cylindrical sleeve portion 51 is mounted a spiral spring 57 housed in a recess 58, the innermost turn 57' of the spring being a tight frictional grip on the sleeve 51 so that normally when the sleeve reciprocates within a certain predetermined range the spring is drawn along with the sleeve, but if the sleeve moves outside this range the spring drags along the sleeve to a new position.

The device 24 functions in the following way:

So long as the movement of the shoes is such that the innermost turn 57' of the spring does not exceed the distance between the undistorted position of the spring (shown in Figure 3) and the inside wall of its housing 58, the spring remains in the same position on the sleeve 51 and serves as a return spring to bring the sleeve 51 back to its normal position. This movement allows the self-wrapping action of the shoes to take place and for small inequalities of wear between the shoes.

If, however, due to larger inequalities of wear, the sleeve 51 is moved excessively to the right or left, the turn 57' of the spring is first brought into contact with an internal wall of its housing and thereafter drags on the sleeve 51 to take up a new mean position thereon.

Normal wear is taken up by turning the squared end 56 of the shaft 55 which serves to rotate pinion 53 and thus separate the yokes 47 and 48 carrying the lower ends of the shoes 22 and 23.

In Figure 5 there is illustrated a modification the wear compensating device in which the spring 57 of Figure 3 is replaced by a resilient washer 59 the periphery of which engages the extremity of the oblate spheroidal recess 60 in the housing and the inner wall of which engages between flanges 61 formed on a split collar 62 which is a tight press fit on the cylindrical portion of the sleeve 51.

The washer 59 takes the place of the spring 57 of Figure 3, otherwise the device functions in a manner similar to that of Figure 3.

The resilient members 57 and 59 may be replaced by any other equivalent member.

It will be seen that the adjustment is constant in operation and gives full automatic control for uneven wear, a feature which is highly desirable for brakes of the self-wrapping type, which, in some forms, have a high tendency to uneven wear.

I claim:

1. In a brake of the type including a brake drum, a relatively fixed back plate for said drum, a pair of arcuate shoes within said drum, brake-operating means for expanding one pair of adjacent ends of the shoes against the drum, an externally threaded finger connected with each shoe at the other pair of the adjacent ends of the shoes, a support carried by said back plate, and an internally threaded sleeve receiving said fingers and slidably carried by said support, the combination with said sleeve of a resilient member surrounding said sleeve and having one part fixedly connected with the back plate and another part of said member frictionally surrounding said sleeve to normally follow and recenter said sleeve but to slip along said sleeve upon excessive movement thereof to effect a new centering of said sleeve.

2. A brake as defined in claim 1 wherein said resilient member comprises a spiral spring.

3. A device as defined in claim 1 wherein said resilient member comprises a spring washer.

4. A device as defined in claim 1 wherein said member is of annular form and normally at right angles to said sleeve, said member being housed within an internal oblate spheroidal recess in said support, the side walls of said recess forming stops to limit the movement of said member in following said sleeve.

PIERRE FARKAS.

REFERENCES CITED

The following references are of record in the file of this patent:

UNITED STATES PATENTS

| Number | Name | Date |
|---|---|---|
| 2,124,786 | La Brie | July 26, 1938 |
| 2,132,049 | Schlumbrecht | Oct. 4, 1938 |